Nov. 19, 1968  M. PUGLIESE  3,412,053
PRINTING INKS AND VARNISHES
Filed July 7, 1966
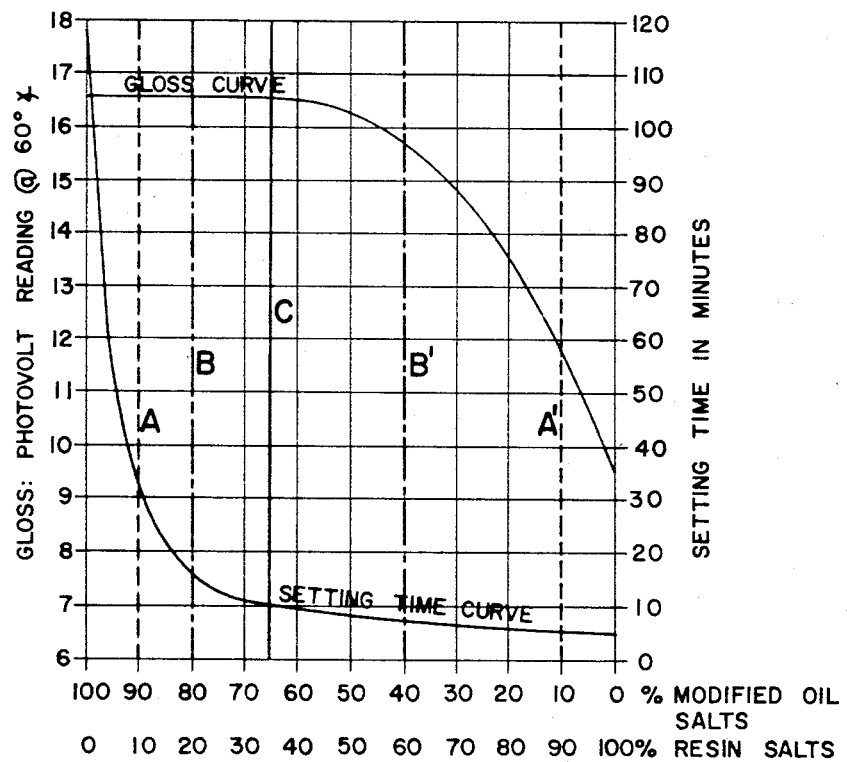
INVENTOR
MICHAEL PUGLIESE
BY *Elton H Brown, Jr.*

3,412,053
PRINTING INKS AND VARNISHES
Michael Pugliese, Passaic, N.J., assignor to J. M. Huber Corporation, Locust, N.J., a corporation of New Jersey
Continuation-in-part of application Ser. No. 464,535, June 16, 1965. This application July 7, 1966, Ser. No. 563,607
18 Claims. (Cl. 260—18)

ABSTRACT OF THE DISCLOSURE

A high gloss, quick drying printing varnish, or a corresponding ink, containing an organic solvent, a soluble salt of an acidic resin of an acid number of at least 40 and a nitrogenous base, and a soluble salt of an acidic modified drying oil of acid number of at least 40 and a nitrogenous base, is applied to a porous substrate. Upon decomposition of the respective salts to free base and acidic resin and the acidic modified drying oil, said acidic resin and said acidic modified drying oil are insolubilized and deposit on the porous substrate.

---

This application is a continuation-in-part of applicant's co-pending patent application, Ser. No. 464,535, filed June 16, 1965, which in turn is a continuation-in-part of applicant's co-pending patent application, Ser. No. 380,660, filed July 6, 1964.

This invention relates to high gloss, quick setting printing ink varnishes and high gloss, quick setting printing inks produced therefrom.

Printing inks consists of a varnish and a coloring agent, the combination forming a mixture with flow characteristics which permit its distribution over the printing plate and its transfer from the printing plate to the surface to be printed. The varnish is usually a solution of a binder in a liquid vehicle and serves the dual functions of dispersing a coloring agent in the varnish and binding it to the substrate on which it is applied. The liquid vehicle is usually an organic solvent or a mixture of organic solvents. The coloring agent can be an organic or inorganic pigment or a dye, for example, the coloring agent in black printing inks is carbon black.

Quick setting inks, i.e. those which upon being printed on paper will set within 30 minutes or less and produce a set film of sufficient hardness to permit further handling without smearing, are of two main types, moisture or vapor set and heat set, each of which requires external means to achieve setting.

Moisture or vapor set inks are quick drying inks prepared by dissolving water-insoluble resins in a water miscible solvent.

The setting of these inks is accelerated, after being printed, by exposing the printed sheet to steam or water mist. The water mixes with the water-miscible solvent until the resin is no longer soluble in the mixture and precipitates from the solvent, thus becoming a solid binder for the pigment to the substrate. Such inks will remain unchanged on the distributing system of a press for considerable periods of time because the solvents are usually only very slightly volatile.

The disadvantages of vapor set inks are that if the atmosphere becomes too humid, the ink absorbs moisture and precipitates. Also, fast drying cannot be achieved without the use of steam, which is uneconomical and causes the atmospheric humidity to increase resulting in ink instability on the press. Vapor set inks also do not achieve the high gloss desired for many applications, for example, printed cartons used in the retail sale of food products. These inks are difficult to wash off the press. Water is not suitable and an organic solvent such as an alcohol is necessary. This, of course, requires safety precautions which increase costs.

Heat set inks are produced with solutions of resins in volatile petroleum oil solvents. In this case, the solvent cannot be too volatile or it will evaporate on the distribution system. The oils used in practice preferably distill bewteen 450° F. and 550° F. In order to dry a sheet printed with such an ink in a very short time, external heating means are required using temperatures which are so high that the quality of the sheet is considerably impaired. This application of heat evaporates the solvents, leaving the resin as a solid binder for the pigment to the substrate.

Other developments in the printing ink field include, for example, those disclosed in U.S. Patent 2,720,461 to Andries Voet. The ink varnishes are produced by dissolving certain resin salts in water miscible aliphatic organic solvents. These ink varnishes are employed in the preparation of printing inks by incorporating coloring agents therein. The inks set rapidly by decomposition of the resin salts to liberate the free base and a free acidic resin, without the use of external means. The free base volatilizes into the atmosphere or is absorbed into the paper and the free acidic resin which then is insoluble in the liquid vehicle, precipitates, as a solid binder for the coloring matter upon the printed sheet. The precipitation of the resin immediately causes release of the liquid vehicle which is then absorbed into the paper. Instantaneous decomposition of the salt is also accomplished by the addition of weak acids, steam or heat. Decomposition can also occur spontaneously on the sheet if it is of an acid pH. These inks are stable on the press and are water washable from the equipment.

The inks described in U.S. Patent 2,720,461 and moisture set inks are used predominantly for printing natural and bleached kraft using the letterpress process. These inks, however, are disadvantageous since they do not display high gloss upon drying. This prevents their use in areas where high gloss inks are desirable such as in the printing of receptacles and cartons for retail food products wherein the high gloss printing is desired to make the product more salable.

High gloss printing inks, i.e. those inks which, upon printing on paper, dry to produce a hard film having a gloss reading ranging from 10 to 20 or higher, can be produced by using an oxidizing polymerizable vehicle such as a drying oil or an alkyd oil which may also contain a phenolic resin in solution. With this type of drying vehicle it is possible to achieve a very high ratio of binder volume to pigment volume, resulting in good rheological properties of the inks and good coating and wetting of the pigment with the binder. These are the oleoresinous inks which are the prime high gloss inks in use in commerce and are generally used as a standard to compare the gloss of other inks.

The drying oils of the oleoresins inks are solvents in the preparation of the fluid ink vehicle, but upon application in the form of a thin film on paper, polymerize into a solid state, thus increasing the total amount of binder in the ink film. These inks have good leveling properties and high gloss. Unfortunately, conversion of these inks from a fluid state into a solid state, after printing, is a slow process depending upon the oxidation-polymerization of the drying oil with a resultant undesirably long setting time, at least 3 or 4 hours up to 12 or more hours. This type of ink also has a tendency to form a skin when stored and to dry on the press rollers in use. These inks also require non-polar organic solvents to wash them from equipment.

The ink industry has long sought methods of improving printing inks and printing ink varnishes with the ultimate goal of an ink which has all the advantages of the presently known inks without any of the disadvantages.

It is an object of this invention to provide novel printing ink varnishes which are suitable for the preparation of high gloss printing inks which are quick drying without the use of external drying means.

Another object of this invention is to provide such printing inks and varnishes which are press stable.

A still further object of this invention is to provide such printing inks and varnishes which do not produce skin on aging in storage.

Another object of this invention is to provide such printing inks and varnishes which are water soluble and can be washed from equipment with water.

Another object of this invention is to provide varnishes having excellent wetting capability for pigments.

A still further object of this invention is to provide printing inks and varnishes which, when dry, form films with high resistance to abrasion, water, solvents, and chemical attack.

Other objects and advantages will become apparent from the following specification in which the figure is a graph illustrating the relationship of gloss and setting time of the inks of this invention.

As used in this specification, resins are solid or semi-solid, complex, amorphous mixture of organic substances, having no definite melting point and showing no tendency to crystallize.

Drying oils are liquid triglyceryl esters of unsaturated fatty acids. Upon reaction with oxygen of the air, drying oils are subjected to oxidation-polymerization resulting in the formation of a solid film.

High gloss printing ink refers to those inks which, upon printing on paper, will dry producing a hard film having a gloss reading ranging from 10 to 20 or higher when measured with a Photovolt Model 610, using gloss meter Model 660-A which gives the gloss reading at 60° angle and is used to measure the specular reflection of varnishes and paints. The gloss of an ink is highly dependent on the paper on which the ink is printed and on the film thickness; therefore, comparisons are made between inks printed on the same paper and under the same conditions.

I have discovered that inks which accomplish the objects of this invention may be obtained by using a vehicle comprising liquid salts of modified drying oils in combination with resin salts, dissolved in organic solvents.

The components of the printing inks and varnishes of this invention comprise modified drying oil salts which are liquid and miscible with the hereinafter defined organic solvents, or mixtures of organic solvents, or mixtures of these solvents with water and whose acidic form is immiscible with the same solvent substances and water; a resin salt which is soluble in the same solvent substances, water, and also in the salts of the acidic modified drying oil; the acidic resins from which the salts are derived are insoluble in the solvent substances, water, and acidic modified drying oils. The salts of the modified drying oils and of the acidic resins are made by neutralization with nitrogenous bases that have a dissociation constant of $1 \times 10^{-6}$ or greater at 25° C.

Thus the ink and ink varnish compositions of this invention contain the modified drying oil salt, a resin salt and a solvent. Coloring agents such as pigments as well as other conventional ink additives are also used in the ink compositions of this invention.

The drying characteristics of the printing inks and varnishes of this invention are determined to a great degree by the strength of the bonding between the amine and acid groups as well as the volatility of the amine.

The drying of the printing inks and varnishes of this invention occurs when the amine salts of the modified drying oils and resins are decomposed and the nitrogenous base is withdrawn from the system leaving only insoluble acidic components to precipitate on the substrate, usually paper, boxboard, wood or other porous printable material. In effect, a non-solvent containing system results in which the acidic resin, acidic drying oil, and liquid solvent are mutually incompatible.

This decomposition is triggered by evaporation and/or absorption of the amine by the paper, disturbing the equilibrium of the solution and moving it to the right as follows, using the ammonium salt as illustrative:

$$R\text{-}COONH_4 \rightleftharpoons R\text{-}COOH + NH_3$$

As the amine is absorbed into the paper or volatilized, more acidic components are formed leaving a mutually incompatible three component system. The organic solvents or mixtures thereof or mixtures thereof with water which are present in the printing ink or varnish are rapidly released and eliminated from the ink film by absorption into the paper or evaporation upon formation of the acidic insoluble modified drying oil and acidic insoluble resin. Upon elimination of the solvent a set film composed of an intimate mixture of the acidic modified drying oil and acidic resin is formed. This set film in most cases is sufficiently hard within 15 minutes to avoid smearing when the printed sheet is subjected to further operations. Subsequent oxidation and polymerization of the modified drying oil induces a solid state to the oil which increases the total volume of binder with resulting high gloss and excellent physical properties of the dry ink film. The speed of drying of the compositions, manifested by complete removal of nitrogenous bases and solvents depends upon the character of the substrate, character of the amine, type of solvent, and degree of insolubility of the acidic modified drying oil and acidic resin in each other and in the solvents.

The character of the paper is important because it must have a strong enough attraction for the amine to be able to disturb the equilibrium, as illustrated, and absorb the amine. It also must have a great absorptive attraction for the solvent, thus permitting fast solvent release from the acidic materials. As a general rule, the amines and solvents with the smaller molecules will be more rapidly absorbed into the substrate than those with larger more complex molecules.

Particularly useful nitrogenous bases are those with a basic dissociation constant of $1 \times 10^{-6}$ or greater at 25° C. and form amine salts which are suitably stable on the press but are easily decomposed on a suitable substrate. These amines are exemplified by the following which are useful alone or mixed in practice of this invention: ammonia, methylamine, ethylamine, dimethylamine diethylamine, n-butylamine, di-n-butylamine, triethylamine, ethylenediamine, diethylenetriamine, triethylenetetramine, tetraethylenepentamine, propylenediamine, ethanolamine, hexylamine, lauryl amine, diethanolamine, triethanolamine, dimethylethanolamine, morpholine, piperidine, propylamine, isopropylamine, and isobutylamine. The drying time and press stability of the ink depends upon the choice of amine, generally alkanolamines impart the best press stability to the varnishes and inks but increase the drying time somewhat when compared to ammonia or alkyl amines.

The organic solvents to be employed in this invention are the neutral water miscible aliphatic solvents in which the acidic resin and acidic modified drying oil are respectively insoluble or immiscible at any concentration. The speed and ease with which the solvents are absorbed into the substrate varies with the solubility characteristics of the acidic material and the polarity and molecular size of the solvent, for example, lower glycols are speedily released from the acidic materials, water is released even faster.

Solvents which are suitable for use in this invention are, typically, alcohols, formamide and the glycols, ethers of glycols, and esters of glycols. Those which contain from 2 to 8 carbon atoms and only carbon, hydrogen, and oxygen are preferred, including polyglycols. However, polyglycols having a molecular weight of about 600 and above are not water miscible and hence not suitable. Representative glycols and their ethers and esters which are satisfactory are ethylene glycol, diethylene glycols, triethylene glycol, butylene glycol-1,2, hexylene glycol, cellosolve, butyl cellosolve, monobutyl ether of ethylene glycol, monomethyl ether of ethylene glycol, monoethyl ether of diethylene glycol, monoethyl ether of ethylene glycol, monobutyl ether of diethylene glycol, monobutyl ether of diethylene glycol, ethylene glycol monoethyl ether acetate, diethylene glycol monoethyl ether acetate, triethylene glycol methyl ether acetate and glycerin.

Each of the acidic resins and acidic drying oil adducts are soluble in one or more of such solvents but are insoluble in others, as is well known in the art, and the solvents or mixtures of solvents to be employed with any particular resin will be selected to provide a medium in which such resin and adduct are insoluble and in which their amine salts are soluble.

The resins which are employed as the salts are acidic resins which are insoluble in water and the organic solvents used in this invention. The resins may be natural or synthetic resins such as rosin, polymerized rosin, disproportonated rosin, hydrogenated rosin, adduct compounds of terpenes and alpha-beta unsaturated dicarboxylic acids, shellac, copal, sandarac, alkyd resins, adduct compounds of rosin with alpha-beta unsaturated dicarboxylic acids, and partly esterified resins. However, the exact chemical structure representing the resin is not critical, it is the solubility characteristics of the resin which determine its suitability for use in this invention.

Those acidic resins which fulfill the solubility requirements of this invention either do not solubilize at all in the solvents or their solubility is so poor that upon dilution of a concentrated varnish with more of the same solvent already present in the varnish, the resin precipitates as shown by a phase separation or cloudy solution. Even though a resin may be considered soluble at high concentrations, it is considered insoluble for purposes of this invention if a phase separation or cloudy mixture results upon dilution with the same solvent.

The acidic resins are made soluble in water, the organic solvents, and the modified drying salts used in this invention, as well as mixtures thereof, by neutralization with the nitrogenous bases mentioned.

In practice, it has been found that resins with acid numbers of at least 40 are suitable. There is no upper limit as to the acid number, however, the solubility characteristics of the materials are a limiting factor and this varies with the resin and modified drying oil and cannot be satisfactorily defined by acid number.

Even when the resin has an acid number lower than 90 it can be made into a salt which is soluble in organic solvents used in inks, glycols for example. Thus resins of wider scope than used in U.S. Patent 2,720,461 can be utilized in this invention.

The liquid modified drying oils are obtained by reacting drying oils with an iodine number of at least about 120 with alpha-beta ethylenically unsaturated carboxylic acids. Examples of suitable drying oils are linseed oil, tung oil, cottonseed oil, sunflower oil, and perilla oil, and others, all unsaturated nonhydroxylated oils.

Suitable alpha-beta ethylenically unsaturated carboxylic acids are for example, maleic acid or maleic anhydride, fumaric acid, itaconic acid, acrylic acid, citraconic acid, and the like.

The resulting adducts are acidic in nature and can be neutralized with nitrogenous bases. The acidic modified drying oils must have an acid number of at least 40 and must be insoluble in water and in the organic solvents useful in this invention and mixtures thereof. When neutralized with the previously mentioned ntirogenous bases, they must become soluble in the solvents or mixtures of solvents used in the composition of this invention.

If the acid number of the oil adduct is too high (over 180) it is too viscous for practical use and will not have sufficient unsaturation to polymerize and form a hard film. Even dilution with a solvent would be unsatisfactory because insufficient adduct would be present in the ink resulting in an unsatisfactory film. Preferably the acid number of the adduct is between about 90 and 170.

It is well known that the method of producing the modified drying oil is important in determining the properties of the adduct. The adducts useful in this invention are prepared by reacting the oxidizing drying oil with alpha-beta ethylenically unsaturated carboxylic acids at temperatures between 125° C. and 350° C., preferably at about 200° C. for from about 15 minutes to 3 hours, using enough carboxylic acid to obtain an adduct with an acid number greater than about 40.

Esterification of the acid or acid anhydride group on the oil adduct is frequently desirable. This is accomplished by reaction with an alcohol which can be either mono, di or polyhydric. These alcohols are the same ones useful as solvents in this invention. The amount of half ester which is formed by this reaction should be limited to control the solubility parameter of the adducts. When anhydrides are used to make the adducts, the esterification reaction occurs at low temperature. This half ester formation decreases the acid number of the adduct. If no half ester is desired, the anhydride ring can be opened with water to form carboxylic acid groups.

The method of solubilizing both the acidic resin and liquid acidic modified drying oil consists of reacting them with a nitrogenous base using about 60% to 120% of the theoretical amount required for neutralization.

The salts of the drying oil adducts can act as the solvents in the varnishes of this invention. In many instances it is desired to modify the tack, flow, and consistency of the varnishes and also improve water solubility. This is accomplished by adding the aforementioned water miscible organic solvent.

The ink varnishes of this invention comprise from 30% to 98% by weight of the ink composition of this invention, the remaining portion being the coloring agent and additives.

The amount of modified drying oil salt plus the resin salt accounts for about 20% to 90% by weight of the ink varnish, the remaining portion being the aforementioned organic solvents or their mixtures with water.

The drawing is a graph which illustrates the effects of interaction of the modified drying oil salt and resin salt on the setting and gloss properties of the printing inks of this invention. For example, an ink containing a ratio of 1 part modified drying oil salt per 9 parts of resin salt has a setting time of about 6 minutes and a gloss of 11.9. As the ratio of modified drying oil salt to resin salt present in the ink increases, the gloss of the ink increases to values much greater than the expected additive effect and the increase in drying time is much less than expected from the additive effect of the ingredients. As can be seen from the figure, the ratios of modified drying oil salt to resin salt in the inks and varnishes of this invention of from 10:90 to 90:10 are effective and result in good ink varnishes and printing inks. The preferred inks and varnishes are those encompassed by the widest part of the curves, i.e. at ratios of modified drying oil salts to resin salts of 40:60 to 80:20. The best possible relationship is illustrated by the graph at the point wherein the ratio of modified drying oil salt to resin salt is 65:35.

This graph represents the parameters of the compositions of this invention in terms of the ratio of modified drying oil salt to resin salt. Any composition falling within the widest ratios defined by the dotted lines A, A′ are within the invention. The compositions within B, B′ are the preferred compositions in terms of gloss and setting time and the composition represented by C is the preferred composition. Outside the compositions defined by A, A′ most of the desired interaction is not present and inks with either high gloss and slow setting time or low gloss and fast setting time result.

The ingredients of the ink varnishes of this invention can be mixed together in any order such, as, resin salt mixed with modified drying oil salt then the mixture diluted, if desired, with a solvent. Another method is to thin the resin salt with a solvent then mix it with the modified drying oil salt. To form the ink, the required pigment and additives are incorporated in the conventional manner.

The compositions of this invention result in very quick setting, generally much less than 30 minutes, and very high gloss inks and ink varnishes which are stable overnight on the press. These compositions can be washed off equipment with water and generally do not form skin on aging. In fact, these inks and ink varnishes are comparable to the commercially used oleoresinous printing inks in gloss, yet are superior in aging characteristics and press stability as well as set and drying time. For example the inks of this invention set to touch within 5 to 20 minutes depending on the paper and dry on the paper in 10 minutes to one hour, with no drying on the press. The oleoresinous inks in commercial use today dry in at least three hours on the paper as well as the press.

The invention is illustrated by the following examples, in which amounts are by weight except where otherwise specified.

Example 1

60.75 parts of tung oil and 14.25 parts of maleic anhydride were stirred together for 30 minutes at 190° C. The resulting product was clear, slightly viscous and light colored and had an acid number of 165. It did not contain any unreacted maleic anhydride.

9.5 parts of ethylene glycol and 13.5 parts of dimethylethanolamine and 2 parts of water were added to the adduct after cooling to 80° C. This resulted in a clear solution of pH 8.6 and acid number of 90. This is called Portion A.

100 parts of a maleic resin with an acid number of 110 and a melting point of 115° C. was stirred for 30 minutes at 130° C. with 11 parts of dimethylethanolamine in 39 parts of ethylene glycol. A complete, clear solution resulted which, upon cooling, had a consistency of a smooth syrup and a pH of 8.8. This is called Portion B.

Portion A and Portion B were mixed in a ratio of about 1½ parts A to 1 part B to form an ink varnish. This is called Varnish I.

A thin film of this varnish was applied to a glass slab and remained wet for at least 6 hours. When applied to paper, such as natural kraft, the varnish set in 20 minutes. Upon standing in a container for two weeks, no skin formed. The varnish was water soluble and formed glossy films.

A modified maleic rosin type resin Amberol 820 by Rohm and Haas, acid number 320, described as soluble in ethylene glycol was mixed with ethylene glycol in a ratio by weight of 60% resin and 40% solvent. A clear solution resulted. 24 parts of dimethylethanolamine was added to 100 parts of the resin-ethylene glycol solution. A clear solution with pH 8 resulted. Upon dilution with the glycol solvent, no precipitate results. This is called Portion C. If the solution is diluted to 15% solids prior to addition of dimethylethanolamine the acidic resin precipitates.

Portion A and Portion C were mixed in a ratio of about 1½ parts A to 1 part of C to form an ink varnish. This is called Varnish II.

A thin film of this varnish was applied to a glass slab and remained wet for at least 6 hours. When applied to paper, such as natural kraft, the varnish set in 30 minutes. Upon standing in a container for 2 weeks, no skin formed. The varnish was water soluble and produced glossy films.

Example 2

100 parts of tung oil and 12 parts of acrylic acid were mixed and heated at 220° C. for about 40 minutes. The resulting adduct had an acid number of 79. 50 parts of a modified ester of rosin with an acid number of 78 and a melting point of 116° C. was added slowly to the reaction mixture maintained at 140° C. The resin melted but did not dissolve in the drying oil adduct. The mixture was cooled to 100° C. and 25 parts of dimethylethanolamine was added. The mixture was stirred for 20 minutes and a clear solution with a pH of 8.0 resulted. The resulting varnish was soluble in water, ethylene glycol and diethylene glycol. The varnish produced very glossy films and was very stable.

Example 3

100 parts of tung oil and 14 parts of fumaric acid were mixed together for 40 minutes at 200° C. The adduct had an acid number of 90. It was cooled to 40° C. and neutralized with 12 parts of triethylamine. This product is designated Varnish A.

100 parts of a maleic resin with an acid number of 140 and a melting point of 100° C. was dissolved in a mixture of 76 parts of ethylene glycol, 10 parts of glycerine and 14 parts of monoethanolamine. This product is designated Varnish B.

50 parts of Varnish A and 100 parts of Varnish B were mixed to produce an ink vehicle which was suitable for the glossy, fast drying inks of this invention.

Example 4

100 parts of tung oil were mixed with 20 parts of maleic anhydride for 30 minutes at 200° C. The adduct had an acid number of 120.

65 parts of the adduct were mixed with 10 parts of dimethylethanolamine and 30 parts of an alkyd resin with an acid number of 132 and a melting point of 122° C. for 30 minutes at 130° C. The resulting product was very viscous and was diluted with 30 parts of ethylene glycol and 10 parts of water. The product had a pH of 7.8.

Example 5

100 parts of tung oil and 15.5 parts of itaconic acid were mixed together for 1 hour at 220° C. The adduct had an acid number of 53. It was neutralized with 15 parts of 28% aqueous ammonia. This product was designated Varnish C.

100 parts of maleic resin with an acid number of 110 and a melting point of 115° C. was dissolved at 100° C. in a mixture of 80 parts ethylene glycol and 20 parts dimethylethanolamine and was designated Varnish D.

115 parts of Varnish C and 200 parts of Varnish D were mixed together producing a clear, viscous liquid with a pH of 8.5. This product dried in a few minutes when applied on natural kraft in the form of a thin film.

Example 6

100 parts of refined linseed oil and 12 parts of maleic anhydride were mixed together in a nitrogen atmosphere for 90 minutes at 280° C. The adduct had an acid number of 58.

55 parts of this product, 15 parts of dimethylethanolamine and 30 parts of a modified ester of rosin with an acid number of 78 and a melting point of 116° C. were mixed together at 150° C. until a complete solution was obtained. A viscous varnish resulted. This varnish was diluted with 30 parts of ethylene glycol and 10 parts of diethylene glycol to produce a clear, very stable vehicle with a pH of 7.9.

Example 7

An ink containing 55 parts of Varnish I of Example 1,

| | Parts |
|---|---|
| Wax compound | 5 |
| Dryer paste containing cobalt, manganese, and lead | 2 |
| Alkali blue pigment | 2.5 |
| Milori Blue | 13 |
| $TiO_2$ | 12 |
| Zeolex (sodium aluminosilicate by J. M. Huber Corporation) | 1 |
| Ethylene glycol | 9.5 | was prepared in the following manner. The materials were mixed and the mixture was given 2 passes on a roller mill.

The resulting ink had a pH of 8.6, was stable on the press overnight, and its stability was independent of the relative humidity. It did not produce skin when kept in an open container for 2 weeks and was washed from the press with water.

When printed on natural kraft paper, the ink film was set within 7–8 minutes and completely dry after 15 minutes.

The ink had a high gloss superior to conventional moisture setting inks and equal to a similarly colored commerical oleoresinous ink.

Example 8

An ink containing 72 parts of Varnish II of Example 1,

| | Parts |
|---|---|
| Red Lake C Pigment | 12 |
| Wax compound | 5 |
| Dryer paste containing cobalt, manganese, and lead | 2 |
| Ethylene glycol | 9 | was prepared in the following manner. The materials were mixed and the mixture was given 2 passes on a roller mill.

The resulting ink had a pH of 8.4, was stable on the press overnight, and its stability was independent of the relative humidity. It did not produce skin when kept in an open container for 2 weeks and was washed from the press with water.

When printed on natural kraft paper, the ink film was set within 15 minutes and dry after 30 minutes with some aftertack remaining for a few hours.

Example 9

An ink concentrate was prepared from the following ingredients:

| | Parts |
|---|---|
| Varnish of Example 2 | 60 |
| Calcium Lithol | 20 |
| Water | 5 |
| Glycerine | 5 |

The mixture was given 2 passes on a roller mill. A very fine pigment dispersion was obtained. This illustrates the excellent wetting and dispersing properties of the varnish.

The ink concentrate was diluted to form an ink of the desired rheological properties using the following ingredients:

| | Parts |
|---|---|
| Ink concentrate | 33 |
| Varnish of Example 2 | 55 |
| Ethylene glycol | 12 |

When this ink was distributed on the press rollers, it stood open and remained wet for more than three hours. The ink was also water washable and porduced films of high gloss.

Example 10

An ink was prepared from the following ingredients:

| | Parts |
|---|---|
| Varnish of Example 3 | 73 |
| Monastral Blue | 8 |
| Titanium dioxide | 10 |
| Ethylene glycol | 9 |

This ink was very fast drying and remained wet on the press for about one hour. It produced a good gloss and was water washable.

Example 11

Two black inks were prepared, one containing a drier, the other containing no drier, using the following ingredients—

Ink A:

| | Parts |
|---|---|
| Varnish of Example 4 | 70 |
| Ethylene glycol | 10 |
| Water | 5 |
| Carbon black | 15 |

Ink B:

| | Parts |
|---|---|
| Varnish of Example 4 | 63 |
| Ethylene glycol | 20 |
| Water dispersible cobalt drier (6% cobalt) | 1 |
| Water dispersible manganese drier (6% manganese) | 1 |
| Carbon black | 15 |

Upon aging Ink B produced a thin skin which can be stirred into the ink. Ink A upon aging two weeks in an open container did not produce any skin.

When printed Ink A dried with a slight aftertack, Ink B dried without aftertack. Both Ink A and Ink B produced films of excellent gloss.

Example 12

An ink was prepared from the following ingredients:

| | Parts |
|---|---|
| Varnish of Example 5 | 63 |
| Ethylene glycol | 9 |
| Glycerine | 3 |
| Molybdate orange | 20 |
| Calcium lithol | 5 |

This ink containing a mixture of solvents and a mixture of pigments was very fast drying and produced a film of good gloss.

Example 13

An ink concentrate was prepared from the following ingredients:

| | Parts |
|---|---|
| Alkali blue, green shade | 25 |
| Varnish of Example 6 | 75 |

The ink concentrate was prepared by mixing and rollermilling with three passes on the mill. The pigment was excellently dispersed into the varnish. This illustrates the excellent dispersing properties of the varnishes of this invention since Alkali Blue is generally considered to be one of the most difficulty dispersible pigments used in printing inks.

An ink was prepared using the ink concentrate and the following ingredients:

| | Parts |
|---|---|
| Alkali blue ink concentrate | 30 |
| Titanium dioxide | 10 |
| Clay extender | 10 |
| Varnish of Example 6 | 43 |
| Ethylene glycol | 7 |

This ink produced a film of moderate gloss, was stable on the press and was fast drying.

The inks of this invention are suitable for letter-press printing, particularly for boxboard applications.

It will be understood that the preceding examples have been given for illustrative purposes only and that my invention is not limited to the specific embodiments disclosed therein. It will, on the other hand, be readily apparent to those skilled in the art that many variations can be made in the resin, modified drying oil, the bases and proportions of ingredients within the limits set forth without departing from the spirit or scope of my invention, defined in the appended claims.

I claim:
1. An ink varnish comprising:
  (a) a salt of a thermoplastic organic solvent soluble acidic resin of acid number at least 40 and a nitrogenous base with a basic dissociation constant of greater than $1 \times 10^{-6}$,
  (b) a liquid salt of an acidic modified drying oil of acid number of at least 40 and a nitrogenous base with a basic dissociation constant greater than $1 \times 10^{-6}$, and
  (c) a water miscible aliphatic organic solvent selected from alcohols and glycols, ethers of glycols, and esters of glycols which contain from 2 to 8 carbon atoms and only carbon, hydrogen and oxygen, and mixtures of such organic solvents with water,
wherein from 20% to 90% by weight of said varnish is modified drying oil salt plus resin salt in a ratio of from 9 parts of modified drying oil salt per 1 part of resin salt to 1 part of modified drying oil salt per 9 parts of resin salt, said resin salt being soluble in said modified drying oil salt and in said organic solvents and mixtures thereof with water, said acidic resin being chosen so that it is insoluble in said acidic modified drying oil, said organic solvents, water, and mixtures thereof; said modified drying oil salt being soluble in said organic solvents, and mixtures thereof with water, said acidic modified drying oil being insoluble in said solvents, water, and mixtures thereof.

2. The composition of claim 1 wherein the resin is a maleic resin, the modified drying oil is an adduct of tung oil and maleic anhydride and the nitrogenous base is dimethylethanolamine.

3. The composition of claim 1 wherein the resin is a maleic resin, the modified drying oil is an adduct of fumaric acid and tung oil and the nitrogenous base is dimethylethanolamine.

4. The composition of claim 1 wherein the resin is a maleic resin, the modified drying oil is an adduct of tung oil and maleic anhydride and the nitrogenous base is a mixture of ammonia and an alkanolamine.

5. The composition of claim 1 wherein the resin is a maleic resin, the modified drying oil is an adduct of maleic anhydride and tung oil and the nitrogenous base is a mixture of an alkyl amine and an alkanolamine.

6. The composition of claim 1 wherein the resin is an alkyd resin, the modified drying oil is an adduct of fumaric acid and tung oil and the nitrogenous base is dimethylethanolamine.

7. The composition of claim 1 wherein the resin is a modified ester of rosin, the modified drying oil is an adduct of tung oil and acrylic acid and the nitrogenous base is dimethylethanolamine.

8. The composition of claim 1 wherein the resin is a maleic resin, the modified drying oil is an adduct of tung oil and fumaric acid and the nitrogenous base is a mixture of an alkyl amine and an alkanolamine.

9. The composition of claim 1 wherein the solvent is ethylene glycol.

10. The composition of claim 1 wherein the solvent is dibutyl carbitol.

11. The composition of claim 1 wherein the solvent is a mixture of ethylene glycol and glycerine.

12. The composition of claim 1 wherein the solvent is a mixture of ethylene glycol and water.

13. The composition of claim 1 wherein the ratio of modified drying oil salt to resin salt is from 4:6 parts to 8:2 parts.

14. The composition of claim 1 wherein the ratio of modified drying oil salt to resin salt is 6.5 to 3.5 parts.

15. A printing ink consisting essentially of from 30% to 98% by weight of the composition of claim 1 and coloring matter.

16. A printing ink consisting essentially of from 30% to 98% of the composition of claim 13 and coloring matter.

17. A printing ink consisting essentially of from 30% to 98% of the composition of claim 14 and coloring matter.

18. An ink varnish according to claim 1 and consisting essentially of the listed components (a), (b) and (c).

References Cited

UNITED STATES PATENTS

| | | | |
|---|---|---|---|
| 2,385,737 | 9/1945 | Smith | 106—30 |
| 2,720,461 | 10/1955 | Voet | 106—30 |
| 2,733,155 | 1/1956 | Williams et al. | 106—30 |
| 2,794,747 | 6/1957 | Bloch | 106—28 |
| 3,096,193 | 7/1963 | Tinker et al. | 106—252 |
| 3,100,157 | 8/1963 | Schroeder et al. | 106—252 |
| 3,251,790 | 5/1966 | Christenson et al. | 260—18 |

JULIUS FROME, *Primary Examiner.*

J. B. EVANS, *Assistant Examiner.*